(No Model.) 2 Sheets—Sheet 1.

J. T. DAY & F. HANDY.
GATE.

No. 430,103. Patented June 10, 1890.

Witnesses:
E. P. Ellis
B. Brocken

Inventors:
Jas. T. Day,
Fred Handy,
per Lehmann & Pattison, atty.

(No Model.) 2 Sheets—Sheet 2.

J. T. DAY & F. HANDY.
GATE.

No. 430,103. Patented June 10, 1890.

Witnesses:
E. P. Ellis
B. Brockett

Inventors:
Jas. T. Day,
Fred Handy,
per Lehmann & Pattison,
attys.

UNITED STATES PATENT OFFICE.

JAMES DAY AND FRED HANDY, OF HAZELTON, WISCONSIN.

GATE.

SPECIFICATION forming part of Letters Patent No. 430,103, dated June 10, 1890.

Application filed March 31, 1890. Serial No. 346,099. (No model.)

*To all whom it may concern:*

Be it known that we, JAMES DAY and FRED HANDY, of Hazelton, in the county of Grant and State of Wisconsin, have invented certain new and useful Improvements in Gates; and we do hereby declare the following to be a full, clear, and exact description of the invention, such as will enable others skilled in the art to which it pertains to make and use it, reference being had to the accompanying drawings, which form part of this specification.

Our invention relates to an improvement in gates; and it consists in the combination and arrangement of parts hereinafter fully described, and pointed out in the claims.

The object of our invention is to provide a mechanism whereby the wheels of a vehicle will be made to open and close the gate as a person drives up to and away from it without having to dismount or stop the team.

Figure 1:
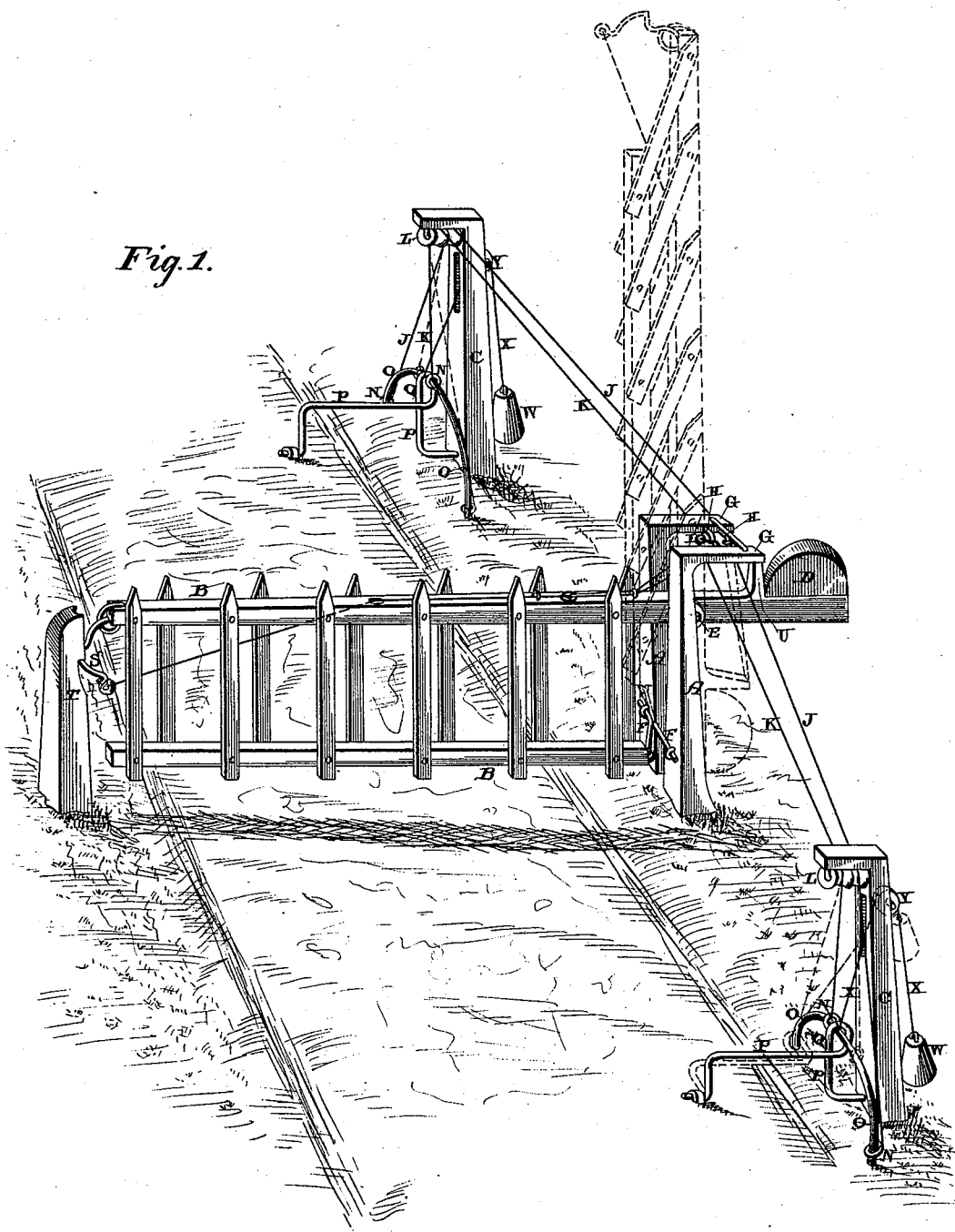
Figure 2:
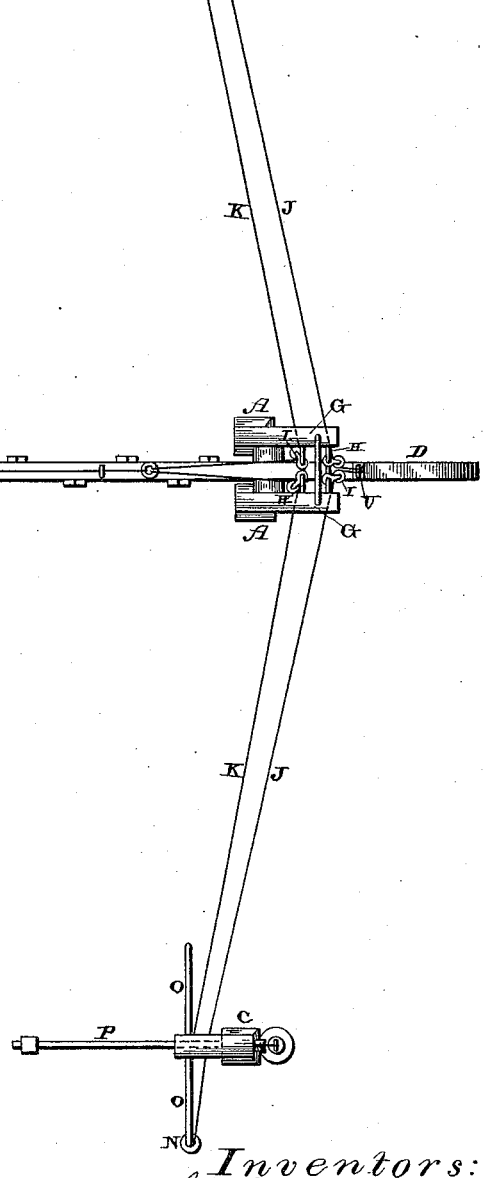
Figure 2:
Figure 3:
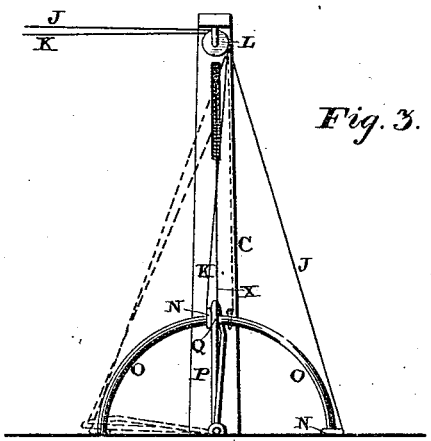

Figure 1 is a side elevation of our invention complete, showing the gate lowered in solid lines and raised in dotted ones. Fig. 2 is a plan view of the same. Fig. 3 is a side elevation of one of the outer posts, showing the parts in one position in solid lines and in another position in dotted ones.

A represents the two posts between which the vertically-moving pivoted gate B is placed, and C the posts located upon each side of the gate, which serve as supports for the operating cords, wires, or chains. To the extreme rear upper corner of the gate B is applied the counter-weight D, which serves to continue the motion of the gate after it has passed the center of motion in being raised, and which prevents the gate from going down with too much force in being closed. A pivot E passes through the top bars of the gate just in the rear of the two posts A, while to the lower corner of the gate is attached a cranked or partially-turning hinge F, which allows the lower corner of the gate to swing through nearly a half-circle. To the upper ends of the posts A are secured the horizontal supporting-bars G, and the rear ends of these bars G are connected by two metallic cross-bars H, upon which guiding-pulleys I are loosely placed. Through these four guiding-pulleys are passed the two operating cords, wires, or chains J K, as shown, for the purpose of changing their direction and causing any pull exerted upon either of the cords to be transferred to the gate. The outer ends of these cords pass over guiding-pulleys L upon the upper ends of the posts C and are fastened to the rings N, which slide freely back and forth upon the curved metallic rods O, secured at the bases of the posts C. Also placed at the bases of the posts C are the cranks or pivoted arms P, which are struck by the wheels of the passing vehicle for the purpose of opening and closing the gate. These arms or cranks are provided with loops or rings Q, which move back and forth over the rods O when the cranks are operated. When the cranks are moved toward the gate by the wheels of the passing vehicles, they strike against one of the rings N and force it from the center of the curved rod O downward toward one end, thus causing the operating-cords to be drawn endwise through their eyes I and over the pulleys L, so as to cause the cords to exert a pull upon the gate for the purpose of raising it. The inner ends of these cords K pass through eyes or guides upon the top of the gate and are fastened to the cord, which is fastened at its outer front end to the spring-latch S. Thus the effect of the pull exerted upon the rope, wire, or cord K is first to release the latch from the post T and then to raise the gate, so as to allow the vehicle to pass through. When the vehicle reaches the crank P on the opposite side of the gate, the wheels strike it and force it downward and away from the gate, thus causing its ring or loop to strike against the ring N, attached to the operating cord, wire, or chain J, and thus close the gate by exerting an upward pull upon its inner end. The cords, wires, or chains J have their inner ends attached to the prong or projection U, which extends upward from the top bar of the gate. As this prong or projection U moves downward when the gate is raised, it is necessary to make the cords, wires, or chains J longer than the cords K, which are taut when the gate is closed and loose when the gate is raised. When the gate is closed, the cords J are slack, and when the gate is raised they are taut. When either one of the cranks P is moved toward the gate, the cords, wires, or chains K are tightened, for the purpose of opening the gate, and when the cranks are moved outward from the gate they tighten the cords, wires, or chains J, for the purpose of closing it. As soon as the crank is released from the pressure of the wheels a weight W through a cord X, which is passed over a pulley Y upon the post C, causes the crank instantly to return to position, so as to be ready to be operated again from either side. When the gate is closed, the spring-latch S at once re-engages with the notch or shoulder in the post T, the cords K being just slack enough when the gate is closed to allow the latch S to spring outward.

Having thus described our invention, we claim—

1. The combination of the post A and the gate B with the pivot E, which passes through the top bar of the gate, and the cranked partially-turning hinge F, secured to the lower corner of the gate, and which allows this corner to swing through a portion of a circle, substantially as shown.

2. The combination of the two posts A, the gate B, pivoted between them and provided with a counter-weight, the two operating-cords J K, rings attached to their outer ends, the curved rods O upon which the rings move, and the crank P, provided with a loop or ring to engage with the rod, substantially as described.

3. The combination of the posts A, the gate B, pivoted between them, suitable guiding-eyes I, supported by the cross-rods H, the cords, wires, or chains K, which are connected at their inner ends to the latch, and the cords, wires, or chains J, connected at their inner ends to the gate, the posts C, provided with guiding-pulleys, the rings attached to the outer ends of the cords, wires, or chains, the curved rod upon which the rings move, and the cranks which move the rings upon the rods, substantially as specified.

In testimony whereof we affix our signatures in presence of two witnesses.

JAMES DAY.
      FRED HANDY.

Witnesses:
 WALTER SHRAKE,
 LUCINDA SHRAKE.